May 22, 1962     R. E. TIBBETTS     3,035,490
ULTRA-VIOLET LENS

Filed Dec. 31, 1958     2 Sheets-Sheet 1

| E.F. = 3.44 IN. | | | | |
|---|---|---|---|---|
| LENS | N | V | RADII | THICKNESS |
| $L_1$ | 1.45845 | 67.6 | $R_1 = \infty$<br>$R_2 = \infty$ | $T_1 = .100$ IN.<br>$S_1 = .008$ |
| $L_2$ | 1.39206 | 99.3 | $R_3 = +1.043$<br>$R_4 = -6.598$ | $T_2 = .472$<br>$S_2 = .157$ |
| $L_3$ | 1.45845 | 67.6 | $R_5 = -1.850$<br>$R_6 = +1.240$ | $T_3 = .157$<br>$S_3 = .276$ |
| $L_4$ | 1.39206 | 99.3 | $R_7 = -5.749$<br>$R_8 = -1.772$ | $T_4 = .236$<br>$S_4 = .008$ |
| $L_5$ | 1.39206 | 99.3 | $R_9 = +2.265$<br>$R_{10} = -1.398$ | $T_5 = .472$<br>$S_5 = .008$ |
| $L_6$ | 1.45845 | 67.6 | $R_{11} = -1.398$<br>$R_{12} = -2.831$ | $T_6 = .197$ |

INVENTOR
*Raymond E. Tibbetts*

BY *Sughrue and Rothwell*
ATTORNEYS

May 22, 1962  R. E. TIBBETTS  3,035,490
ULTRA-VIOLET LENS

Filed Dec. 31, 1958  2 Sheets-Sheet 2

LEGEND
- - - - - - = 2748 Å
―――――― = 2525 Å
― - ― - ― = 2312 Å

United States Patent Office 3,035,490
Patented May 22, 1962

3,035,490
ULTRA-VIOLET LENS
Raymond E. Tibbetts, Rochester, N.Y., assignor to International Business Machines Corporation, New York, N.Y., a corporation of New York
Filed Dec. 31, 1958, Ser. No. 784,331
2 Claims. (Cl. 88—57)

This invention relates to improvements in optical lenses and more particularly to a high aperture, optical lens corrected for spherical and chromatic aberrations, coma, astigmatism, and field curvature in the ultra-violet range of the electromagnetic spectrum.

Much work has been done with ultra-violet radiation. In the use of ultra-violet radiation in photography, it is highly desirable to have a lens that provides good image quality and has relatively high light-gathering power. It is an object of this invention to provide a lens that satisfies these requirements.

The lens according to this invention is of the general type having three components known as a triplet; that is, a three-component lens wherein convergent components sandwich a divergent component with air spaces therebetween. In applying this general three-component lens to refracting ultra-violet light, the rear component is divided into three separate elements to compensate for the difference in wavelength at which the lens is to operate. Division of the rear component into three elements allows correction of the residual chromatic aberrations in the ultra-violet region without interfering with the correction for monochromatic aberrations. Because ultra-violet light or radiation having relatively short wavelengths will be partially absorbed by ordinary optical glass, the refracting materials used are fused quartz and lithium fluoride which have indices of refraction and dispersion for providing proper correction in the ultra-violet wavelength region of the spectrum. With this arrangement it is possible to provide a lens having a high light-gathering power ($f/2.5$) which has been highly corrected for both chromatic and monochromatic aberrations.

Other objects of the invention will be pointed out in the following description and claims and illustrated in the accompanying drawings, which disclose, by way of example, the principle of the invention and the best mode which has been contemplated of applying that principle.

Figures 1, 2:
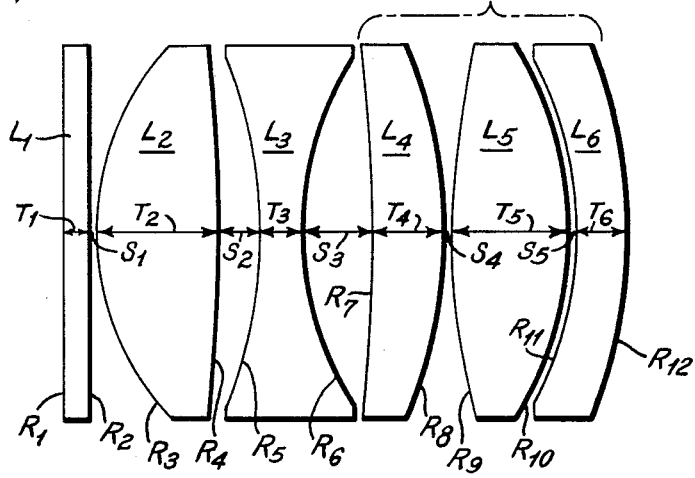
FIG. 1 is a diagrammatic sectional view of an ultra-violet lens according to this invention having an aperture of $f/2.5$.
FIG. 2 is a chart containing constructional data on one specific example of a lens constructed in accordance with this invention.
Figure 3:
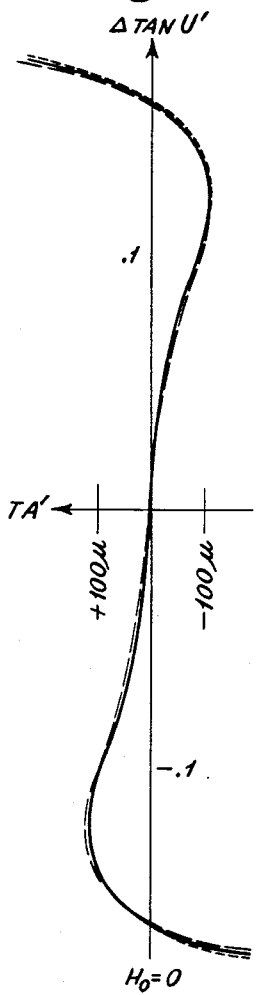
FIG. 3 shows the transverse aberrations of the axial bundle.
Figure 4:
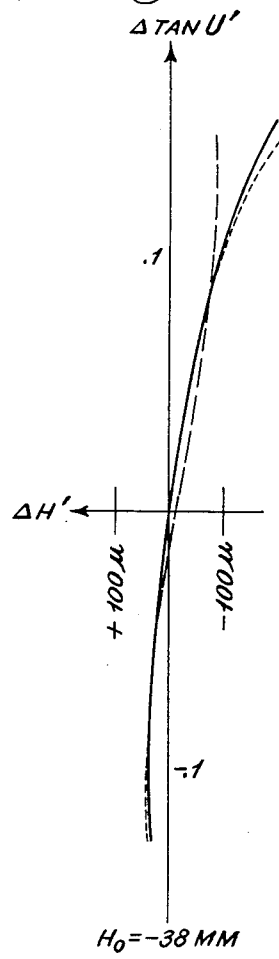
FIGS. 4 and 5 show the tangential image height error.
Figure 5:
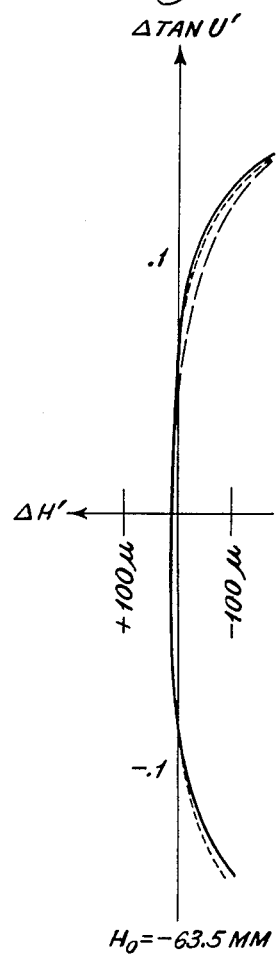
Figure 6:
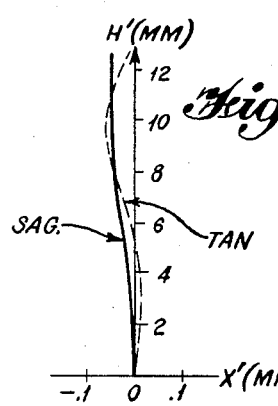
FIG. 6 shows the astigmatic correction.
Figure 7:
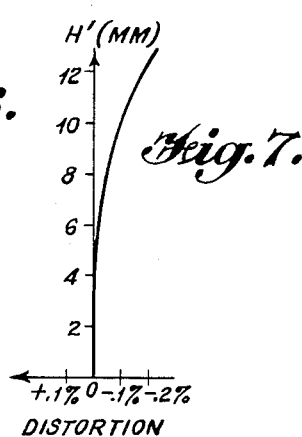
FIG. 7 shows the residual distortion.

As shown in FIG. 1, the lens, which may be considered as a divided rear component triplet corrected in the ultra-violet region of the spectrum, contains a flat quartz protecting plate $L_1$ which is separated and spaced from the single element converging first positive component of the triplet, $L_2$. Element $L_2$ is constructed of lithium fluoride. Middle dispersing component is a single element lens $L_3$ constructed of quartz. The divided rear component of the triplet consists of three separate spaced elements $L_4$, $L_5$, and $L_6$. $L_4$ is a positive meniscus of lithium fluoride, $L_5$ is a double convex lithium fluoride lens, and $L_6$ is a negative meniscus of quartz.

The flat quartz plate $L_1$ is for the purpose of protecting the lithium fluoride element $L_2$ as lithium fluoride is slightly water-soluble and requires protection in humid environments. Elements $L_2$ and $L_3$ function in a manner somewhat similar to the first two elements of a conventional triplet with the exception that they are constructed of materials having indices of refraction and dispersions which will provide proper correction in the ultra-violet wavelength region. The rear component consisting of elements $L_4$, $L_5$, and $L_6$ corrects the residual chromatic aberrations to provide fine image quality without introducing severe monochromatic aberrations which would be the case if a single element rear component were used. A single element middle dispersing component would not produce enough chromatic overcorrection. Therefore, the rear component is split into what might be considered a singlet $L_4$ and a doublet $L_5$ and $L_6$. In this manner, the chromatic aberrations may be balanced while retaining correction for the monochromatic aberrations.

The constructional data for a practical example of a lens having high light-gathering power, an aperture of $f/2.5$, is given in FIG. 2. This data is as follows:

[E.F.=3.44 in.]

| Lens | N | V | Radii | Thickness, inch |
|---|---|---|---|---|
| $L_1$ | 1.45845 | 67.6 | $R_1 = \infty$ | $T_1 = .100$ |
| | | | $R_2 = \infty$ | $S_1 = .008$ |
| $L_2$ | 1.39206 | 99.3 | $R_3 = +1.043$ | $T_2 = .472$ |
| | | | $R_4 = -6.598$ | $S_2 = .157$ |
| $L_3$ | 1.45845 | 67.6 | $R_5 = -1.850$ | $T_3 = .157$ |
| | | | $R_6 = +1.240$ | $S_3 = .276$ |
| $L_4$ | 1.39206 | 99.3 | $R_7 = -5.749$ | $T_4 = .236$ |
| | | | $R_8 = -1.772$ | $S_4 = .008$ |
| $L_5$ | 1.39206 | 99.3 | $R_9 = +2.265$ | $T_5 = .472$ |
| | | | $R_{10} = -1.398$ | $S_5 = .008$ |
| $L_6$ | 1.45845 | 67.6 | $R_{11} = -1.398$ | $T_6 = .197$ |
| | | | $R_{12} = -2.831$ | |

In this table as in the drawings, the lens elements are numbered in order from left to right and front to rear in the first column. N indicates the index of refraction for the sodium line of the refractive elements, and V indicates the conventional dispersive indices. The radii listed in column 4 are for the radii shown in FIG. 1, a plus sign denotes the center of curvature lies to the right of the lens surface and a minus sign indicates that the center of curvature lies to the left of the surface. The fourth column includes the thicknesses T of the various elements and the air spaces S between the elements as indicated in FIG. 1. This lens when used at infinity with ultra-violet light has a relative aperture of $f/2.5$ and when used at a minification of 5 to 1 as designed for in the present example, produces an image of high quality having very little residual aberration. The lens is corrected for chromatic and monochromatic aberrations in the ultra-violet region of the spectrum. The constructional data given above is for a lens designed to work in the ultra-violet region of the electromagnetic spectrum, for example, in the region of 2300 to 2700 angstrom units and provides a 5 to 1 minification. The field covered by this lens is located 19.6 inches before the front surface and is 5 inches in diameter. These figures imply a half field angle of approximately 7°. This lens may be used at other conjugates without noticeable loss of definition. Although the lens was designed to operate at a fixed fractional magnification, its correction is good enough to allow it to be used over a wide range of fractional magnification.

The corrections obtained with this design are shown in

FIGS. 3 through 7. Referring to these figures, the following symbol definitions apply:

$H_o$=height of object in millimeters at 19.6 inches from lens
$TA'$=transverse aberrations in microns along the optical axis
$\Delta H'$=tangential image height errors in microns
$H'$=image height in millimeters
$X'$=amount of tangential and sagittal astigmatic errors in millimeters
$\mu$=microns
$\Delta \tan U'$=slope of rays emerging from lens towards image plane
mm.=millimeters While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An optical lens having a relative aperture of $f/2.5$ and being highly corrected for aberrations in the ultraviolet range of the electromagnetic spectrum, said lens being constructed substantially according to the specification set forth in the following table:

[E.F.=3.44 in.]

| Lens | N | V | Radii | Thickness, inch |
|---|---|---|---|---|
| $L_1$ | 1.45845 | 67.6 | $R_1 = \infty$ | $T_1=.100$ |
|  |  |  | $R_2 = \infty$ | $S_1=.008$ |
| $L_2$ | 1.39206 | 99.3 | $R_3 = +1.043$ | $T_2=.472$ |
|  |  |  | $R_4 = -6.598$ | $S_2=.157$ |
| $L_3$ | 1.45845 | 67.6 | $R_5 = -1.850$ | $T_3=.157$ |
|  |  |  | $R_6 = +1.240$ | $S_3=.276$ |
| $L_4$ | 1.39206 | 99.3 | $R_7 = -5.749$ | $T_4=.236$ |
|  |  |  | $R_8 = -1.772$ | $S_4=.008$ |
| $L_5$ | 1.39206 | 99.3 | $R_9 = +2.265$ | $T_5=.472$ |
|  |  |  | $R_{10} = -1.398$ | $S_5=.008$ |
| $L_6$ | 1.45845 | 67.6 | $R_{11} = -1.398$ | $T_6=.197$ |
|  |  |  | $R_{12} = -2.831$ |  | wherein column 1 contains the separate lens elements, column 2 contains the refractive indices for the sodium line, column 3 contains the dispersive indices, column 4 contains the radii ($R_3$–$R_{12}$) of the lens surfaces, a plus sign indicating the center of curvature to the right of the surface and a minus sign indicating the center of curvatures to the left of the surface, the fifth column containing indications of the thicknesses ($T_1$ to $T_6$) of the lens elements and the air spaces ($S_1$–$S_5$) between the lens elements in inches.

2. An optical lens having a relative aperture of $f/2.5$ and being highly corrected for aberrations in the ultraviolet range of the electromagnetic spectrum, said lens being constructed substantially according to the specification set forth in the following table:

[E.F.=3.44 in.]

| Lens | N | V | Radii | Thickness |
|---|---|---|---|---|
| $L_2$ | 1.39206 | 99.3 | $R_3 = +1.043$ | $T_2=.472$ |
|  |  |  | $R_4 = -6.598$ | $S_2=.157$ |
| $L_3$ | 1.45845 | 67.6 | $R_5 = -1.850$ | $T_3=.157$ |
|  |  |  | $R_6 = +1.240$ | $S_3=.276$ |
| $L_4$ | 1.39206 | 99.3 | $R_7 = -5.749$ | $T_4=.236$ |
|  |  |  | $R_8 = -1.772$ | $S_4=.008$ |
| $L_5$ | 1.39206 | 99.3 | $R_9 = +2.265$ | $T_5=.472$ |
|  |  |  | $R_{10} = -1.398$ | $S_5=.008$ |
| $L_6$ | 1.45845 | 67.6 | $R_{11} = -1.398$ | $T_6=.197$ |
|  |  |  | $R_{12} = -2.831$ |  | wherein column 1 contains the separate lens elements, column 2 contains the refractive indices for the sodium line, column 3 contains the dispersive indices, column 4 contains the radii ($R_3$–$R_{12}$) of the lens surfaces, a plus sign indicating the center of curvature to the right of the surface and a minus sign indicating the center of curvature to the left of the surface, the fifth column containing indications of the thicknesses ($T_2$–$T_6$) of the lens elements and the air spaces ($S_2$–$S_5$) between the lens elements in inches.

References Cited in the file of this patent

UNITED STATES PATENTS

| | | |
|---|---|---|
| 1,540,752 | Bielicke | June 9, 1925 |
| 1,541,407 | Spangenberg | June 9, 1925 |
| 1,580,751 | Merte | Apr. 13, 1926 |
| 2,085,437 | Michelssen | June 29, 1937 |
| 2,416,032 | Warmisham et al. | Feb. 18, 1947 |
| 2,493,110 | Corman | Jan. 3, 1950 |
| 2,561,077 | Tilton | July 17, 1951 |
| 2,571,307 | Taylor | Oct. 16, 1951 |
| 2,645,155 | Tronnier | July 14, 1953 |

FOREIGN PATENTS

| | | |
|---|---|---|
| 847,600 | France | July 3, 1939 |

OTHER REFERENCES

"On Lithium Fluoride-Quartz Achromatic Lenses," Stockbarger and Cartwright: Articles, pages 29, 30, 31, and "Lithium-Fluoride Quartz Apochromat," pages 350, 351 of the Journal of Optical Society of America, vol. 29, January and August 1939.